US005831237A

United States Patent [19]

Daniel

[11] Patent Number: 5,831,237

[45] Date of Patent: Nov. 3, 1998

[54] PLASMA ARC POWER SYSTEM AND METHOD OF OPERATING SAME

[75] Inventor: Joseph Allen Daniel, Mentor, Ohio

[73] Assignee: The Lincoln Electric Company, Cleveland, Ohio

[21] Appl. No.: 815,935

[22] Filed: Mar. 13, 1997

[51] Int. Cl.[6] ........ B23K 10/00

[52] U.S. Cl. ........ 219/121.54; 219/121.57; 219/121.59

[58] Field of Search ........ 219/121.54, 121.57, 219/121.52, 121.48, 75, 74, 121.59

[56] References Cited

U.S. PATENT DOCUMENTS 3,641,308 2/1972 Couch et al. .
4,107,507 8/1978 Schultz et al. ........ 219/121 P
4,897,522 1/1990 Bilczo et al. .
4,897,773 1/1990 Bilczo .
4,943,699 7/1990 Thommes ........ 219/121.57
4,996,407 2/1991 Traxler .
5,045,667 9/1991 Iceland et al. ........ 219/121.54
5,189,277 2/1993 Boisvert et al. ........ 219/121.54
5,225,658 7/1993 Yamaguchi et al. ........ 219/121.57
5,296,665 3/1994 Peterson et al. ........ 219/121.57
5,530,220 6/1996 Tatham .
5,620,617 4/1997 Borowy .
5,630,952 5/1997 Karino .

*Primary Examiner*—Mark H. Paschall
*Attorney, Agent, or Firm*—Vickers, Daniels & Young

[57] ABSTRACT

A plasma system including a torch having an electrode and nozzle with a plasma arc opening exposing the electrode to a workpiece and an input transformer with a primary winding network and a secondary winding network driven by the primary winding network, a first circuit driven by the secondary winding network for creating a pilot arc across the electrode and nozzle, a second circuit driven by the secondary winding network for creating a plasma arc across the electrode and the workpiece and a switch for selectively shifting between the first circuit and the second circuit is improved in a manner where the secondary winding network comprising a first winding with a first effective number of turns for driving the first circuit and a second winding with a second effective number of turns for driving the second circuit, and the first and second effective number of turns can be different to operate the torch by different windings during the pilot arc mode and the cutting mode.

25 Claims, 10 Drawing Sheets

PLASMA ARC POWER SYSTEM AND METHOD OF OPERATING SAME

The present invention relates to electric arc plasma technology and more particularly to an improved plasma system and a method of operating the system to optimize pilot arc mode of operation and the cutting mode of operation in a transferred arc plasma system.

INCORPORATION BY REFERENCE

The invention is directed to an electric arc plasma system where a power supply first creates a pilot arc between the nozzle and electrode of the plasma torch and then transfers the arc to a workpiece moved in proximity to the plasma arc opening of the nozzle. Such a system is described in Couch U.S. Pat. No. 3,641,308, especially FIG. 4. A power supply applies a D.C. voltage across the electrode of the plasma torch and an adjacent workpiece. Until the workpiece is brought close to the plasma torch, the power supply creates an arc between the electrode and the nozzle. This arc, known as a pilot arc, is maintained by current flow through a large resistor and a transfer switch which is closed. To transfer the arc to a closely spaced workpiece for the purpose of cutting the workpiece, the resistor is disconnected from the nozzle so that the resistor is no longer in parallel with the workpiece and the nozzle. When that event occurs, the electric arc is transferred to the workpiece, as long as the workpiece is adjacent to the plasma output of the plasma torch. This standard plasma technology is illustrated in Couch U.S. Pat. No. 3,641,308 and in FIG. 2 of Tatham U.S. Pat. No. 5,530,220 which are incorporated by reference herein.

The power supply for directing a voltage across the electrode and the workpiece in a plasma system is a D.C. power supply; however, in practice the D.C. power supply is often the rectifying output of a full bridge inverter wherein a D.C. power supply is switched rapidly in opposite directions through a primary network or winding of a transformer. The secondary network of the transformer is two oppositely poled secondary windings rectified to produce a pulsating D.C. output, which pulsating D.C. output is normally stabilized by a choke. Such a full bridge inverter for producing D.C. output is disclosed in Bilczo U.S. Pat. No. 4,897,522, which patent is also incorporated by reference herein to illustrate a full bridge inverter to produce a D.C. output. The current flow is switched to create output pulses with a given polarity through rectifying circuits coupled by a choke with the D.C. equipment being operated. In the present invention the D.C. equipment is a plasma system. As illustrated in the Bilczo patent, the switched primary pulses create secondary pulses in opposite directions with the pulse width being adjusted to control the output current. The adjusting circuiting is generally a pulse width modulator operated at approximately 20–40 kHz. Another full bridge inverter is shown in Bilczo U.S. Pat. No. 4,897,773 incorporated by reference herein to illustrate how the output network for a rectified full bridge inverter includes flow of freewheeling current between the rectified output pulses, which pulses are created by the rapidly switched pulses of current in the primary section of a transformer.

The three patents incorporated by reference herein show the state of the art for operation of plasma arc torches and certain full bridge rectified inverters used for D.C. welding, which inverters are the power supplies to which the present invention is particularly directed.

BACKGROUND OF THE INVENTION

Whether operated by a full or half bridge inverter or other D.C. power supplies, an electric arc plasma system of the transferred arc type includes an electrode and nozzle with a plasma arc opening in the end of the nozzle. This opening exposes the electrode to a workpiece which is near the end of the plasma torch. Before the work is cut or otherwise processed by the plasma arc from the torch, a starting sequence is employed wherein a pilot arc is created between the end of the electrode and the inside surface of the nozzle. To allow creation of this pilot arc, it is necessary to create an electrical series circuit with the power supply. To accomplish this objective, a large resistor is connected between the nozzle and the workpiece lead of the power supply. During the starting of the plasma torch, a voltage is applied across this series circuit including the aforementioned large resistor. Current flows through the resistor as soon as a pilot arc is created within the plasma torch. The separate resistor is a circuit parallel to the gap between the nozzle and workpiece. The current flow through the resistor, during the pilot arc mode of operation, creates a voltage between the workpiece and the nozzle. When this voltage is sufficiently high and the workpiece is close enough to the torch, the cutting operation is to be started. A selectively shifted switch disconnects the resistor from its parallel relationship between the workpiece and nozzle so that the pilot arc is transferred from the nozzle to the workpiece to create a series circuit with the workpiece and electrode and the output terminals of the D.C. power supply. Such a system normally requires about 60 volts across the resistor, and the workpiece must be close to the nozzle, to transfer the pilot arc to the workpiece when the cutting operation is to be initiated. The use of a large resistor presents difficulties. The resistance causes heat losses in the system. The voltage is the product of the current and resistance. Heat loss is the product of resistance times the current squared. Since the size of the resistor determines the available voltage between the workpiece and the electrode, the transfer operation for the arc is not always robust. Indeed, in some instances, the arc is not transferred from the pilot mode to the cutting mode when the switch is opened. Instead, a double arc is created between the workpiece and the nozzle and the nozzle and the electrode. This double arc condition will cause damage to the copper nozzle. Since only about 60 volts is created across the resistor, the standoff distance that the workpiece can be spaced from the torch while still allowing transfer is somewhat limited. It has been found that a reliable arc transfer from the pilot mode to the cutting mode requires about 150 mA of current between the workpiece and the electrode before the arc is transferred. If the voltage across the resistor is not sufficient to create this current magnitude, the arc may be extinguished during the attempted arc transfer process. Consequently, a minimum current is needed for the transfer so that when the switch is opened, to disconnect the parallel resistor, there is sufficient current that will allow a positive arc transfer. This is a problem with the prior art to which the present invention is directed. To develop 60 volts through the resistor in parallel with the plasma system, a substantial amount of heat is created. The voltage across the resistor determines the standoff distance available for arc transfer. This is important since the workpiece to be cut should not be brought close enough to contact inadvertently the end of the nozzle. The probability of such destructive contact with the nozzle can be reduced by increasing the transfer standoff distance. This increased standoff is accomplished by increasing the voltage across the resistor with the resultant disadvantages discussed.

Since approximately 150–160 volts are somewhat common across the pilot arc and a voltage of 50–75 volts is a normal voltage drop across the choke or inductor, the power supply must produce a voltage greater than the combined pilot arc and choke voltage by an amount which will cause arc transfer. If the voltage across the resistor is increased to 100 volts, an output for the power supply of approximately 300–350 volts is required. With this level of voltage and current flow, the resistor and transformer output windings must be extremely high capacity. In addition, the normal plasma system with 60 volts across the resistor can only transfer the pilot arc over a relatively small distance, i.e. standoff distance, resulting in the tendency of the operator to bring the torch extremely close to the workpiece so engagement or contact with the end of the plasma torch is a distinct possibility.

In summary, the use of a large resistor in parallel with the workpiece and electrode presents limitations on arc transfer distances, together with the creation of heat loss.

Another disadvantage of the prior art systems for operating an electric arc plasma of the transferred arc type is that the D.C. power supplies are generally inverters wherein a primary alternating current is created by a high speed switching system. The current pulses are used at the primary of a transformer having secondary windings with appropriate rectifiers to create a D.C. power supply. This type of power supply, which is commonly used in plasma technology, has a secondary winding network for the transformer, which network has a single winding. The transformer produces a single voltage and current curve used during both the pilot and cutting mode of operation. Consequently, the secondary winding network on the transformer, whether several windings or a single winding, must be a compromise. It can have only one wire size with a fixed number of turns. Thus, these secondary windings can not be optimized, specifically for the pilot mode of operation, since the same windings must be used in the cutting mode of operation. In addition, the circuitry for controlling the voltage and current during both the pilot mode of operation and the cutting mode of operation must have a large range of adjustment to accommodate low current and high voltage, as well as high current and low voltage plasma arcs. In the pilot mode of operation current is often in the range of about 15–25 amperes and the transformer voltage in the general range of 300–350 volts. For a cutting operation, with the arc transferred, the current is increased to about 50 amperes and the transformer voltage is decreased to about 250 volts. Consequently, the output of an A.C. operated inverter transformer to drive a plasma system, which is now somewhat common practice, must be a compromise between the pilot mode of operation with its high voltage and low current and the transferred arc mode of operation with the high current and low voltage. This dual use of the output presents distinct disadvantages and increases the complexity of controlling the two modes of operation. Thus, prior art systems using a single winding transformer technology where the output of an inverter requires two distinct voltage/current operating areas, which areas are substantially different from each other, are not well suited for both pilot arc and transferred arc operations. These prior systems also have relatively low standoff or transfer distances and relatively high heat loss due to the large parallel resistor. To overcome this problem, it has been suggested to use two power supplies. This concept is expensive, complex and adds size and weight.

THE INVENTION

The present invention is directed to a system of operating an electric arc plasma system, which system allows increase in the transfer distance, i.e. standoff, rapid transfer of the arc from the pilot mode to the cutting mode and does not require the inefficient parallel resistor of the prior art systems. Further, lower primary currents can be obtained because of the secondary winding network. It is possible, by using the present invention, to have lower primary currents for the same required output currents.

In accordance with the present invention, there is provided a plasma system including an electrode and nozzle with a plasma arc opening that exposes the electrode to a closely spaced workpiece, which workpiece is to be cut or otherwise processed. This novel system uses an output transformer of the type used at the output of a full bridge inverter having as its input stage a switched D.C. power supply. Such transformers include a primary winding network and a secondary winding network driven by passing opposite polarity pulses of current through the primary winding network of the transformer. A first circuit means driven by the secondary winding network is used to create a pilot arc across the electrode and nozzle. A second circuit means driven by the secondary winding network is used to create a plasma arc across the electrode and the workpiece. A switching means selectively switches between the first circuit means and the second circuit means. As so far described, this novel plasma system is essentially the system used in the prior art. In accordance with the invention, such a prior plasma system is improved by changing the secondary winding network to include a first winding means with a first effective number of turns for driving the first circuit means and a second winding means with a second effective number of turns for driving the second circuit means. The first and second effective number of turns can be different so the voltage/current operating curve is different during pilot mode and the cutting mode. The "effective" number of turns indicates that the turns in the secondary winding of the system is provided with a number of turns to create the desired voltage/current curve at the output of the transformer. The invention is described by using the phrase "secondary winding network" so that the particular architecture selected for the secondary networks or secondary windings of the transformer is not important. The basic concept of the invention is that two separate windings are used for driving the plasma system, with a first winding optimized for pilot mode of operation and the second winding optimized for the cutting mode of operation. By using this inventive concept, the plasma system can be operated in a high voltage, low current area during the pilot mode of operation and in a low voltage, high current area for the cutting mode of operation. Thus, it is not necessary to compromise, nor it is necessary to provide complicated control equipment for the power supply when the system is shifted between the pilot mode and the cutting mode.

By using the present invention, the output windings can be optimized so that the secondary winding for the pilot mode of operation can be relatively small compared to the relatively large windings for the high current cutting mode of operation. In practice, a small wire, such as 14–16 gauge, is used for the secondary winding connected to the circuit means for creating the pilot arc. A heavy gauge copper ribbon is used as a secondary winding for driving the circuit means used in the cutting mode of operation. By using the present invention, a lower turn ratio can be used for the windings used in cutting. Thus, less primary current is required to provide a particular cutting current. In practice, the pilot turns ratio, primary to secondary is 26:26 and the cutting ratio is 26:24. This gives a voltage difference of about 25 volts which makes a substantial difference in the two output curves.

Higher nozzle to workpiece voltages can be produced to increase the standoff to allow greater arc transfer distance. With no resistor in the system, power loss and heat generation are drastically reduced. By using two separate windings in the secondary of the transformer, a high transfer voltage can be created allowing greater distances of transfer. Dedicated control equipment can be used for operation in two separate areas determined by the architecture of the individual secondary windings for each of the modes of operation. Consequently, the control equipment can operate in a generally middle range and need not have a large control range, which large range is required for controlling a single output winding network that must perform the dual function of pilot arc and cutting arc. The use of the two separate and distinct secondary windings for the plasma system allows immediate shifting from one voltage/current area of operation to another voltage/current area of operation. Thus, the pilot arc and the cutting arc are controlled by a separate and distinct optimized voltage/current curve. A single voltage/current curve is not required for use with both the pilot mode of operation and cutting mode of operation. This control advantage increases the speed of the shifting between the pilot and cutting modes. The control equipment is also relatively less complicated and the reaction time between pilot arc and cutting is decreased.

By using the present invention, as the plasma torch is moved closer to a workpiece to be cut, the cutting operation can be initiated rapidly. Indeed, the transfer can be made over a relatively large distance. This ability to transfer over greater distances is very helpful in certain cutting operations, such as expanded metal where a plasma torch moved along the expanded metal must shift rapidly between pilot arc mode and cutting mode. Such operation is facilitated by the present invention, which invention allows a larger standoff distance and rapid arc transfer.

Further, the standoff voltage can be increased to over 300 volts. When compared to the 60 volts normally available in prior art systems, it is appreciated that the standoff can be increased and the ease of arc transfer can be drastically increased by using this further aspect of the present invention.

In accordance with another aspect of the present invention, the use of two separate secondary windings with a switch to convert from the pilot mode to the cutting mode can be controlled by measuring or sensing the workpiece current. When the workpiece current reaches a certain level, arc transfer occurs by opening the transfer switch. This current level is increased by moving the workpiece toward the cutting torch. Of course, when the workpiece is moved away, this current level decreases. When the sensed current level is above a selected value, the transfer switch is opened to transfer the arc to the workpiece. As the arc length increases, the voltage will increase to a point where the transformer can not deliver the same voltage and current. At this time, the output current will decrease and the transfer switch will be closed, thus, reinitiating the pilot mode of operation. This automatic switching back and forth between the modes of operation is accomplished conveniently in accordance with another aspect of the present invention by the use of current shunts in the circuit means of the present invention.

The primary object of the present invention is the provision of a system and method for operating an electric arc plasma device, which system and method do not require a parallel resistor, produce high standoff distances, and have the ability for rapid arc transfer.

In accordance with another object of the present invention, two separate output or secondary windings are employed in a system and method for operating an electric arc plasma torch. The two windings allow the system and method to optimize operation in both the pilot mode and the cutting mode. In this manner, the voltage/current control equipment can be designed to operate in a center range for each operating mode and need not operate in the extreme outer limits in both modes. Thus, the arc plasma device is operated in two areas of the voltage/current graph, which areas are determined by separate and distinct characteristic curves of the different output windings.

Yet another object of the present invention is a system using separate current sensing arrangements for shifting between the pilot arc to the cutting arc, which system allows very accurate control of the timing for arc transfer to and from the workpiece. In accordance with this object, the exact instant of arc transfer can be selected and controlled by merely operating a switch in response to a particular measured or sensed current.

Yet another object of the present invention is the provision of a system and method, as defined above, which system and method allow a high nozzle to workpiece voltage during the pilot arc mode so that a greater standoff distance is allowed.

A further object of the present invention is the provision of a single power supply that powers both the pilot arc and the main or cut mode with different voltage/current characteristic curves.

Yet another object of the present invention is the provision of a system and method, as defined above, which system and method allow the use of different sized output windings and different gauges of wire for the output windings to control the separate modes of operation of the plasma device.

Still a further object of the present invention is the provision of a system and method, as defined above, which system and method use two separate windings for the pilot arc and cutting arc operations, have current control over the arc transfer process and allow increased standoff distances for the arc transfer.

These and other objects and advantages will become apparent from the following description taken together with the following drawings:

DESCRIPTION OF INVENTION

Figure 1:
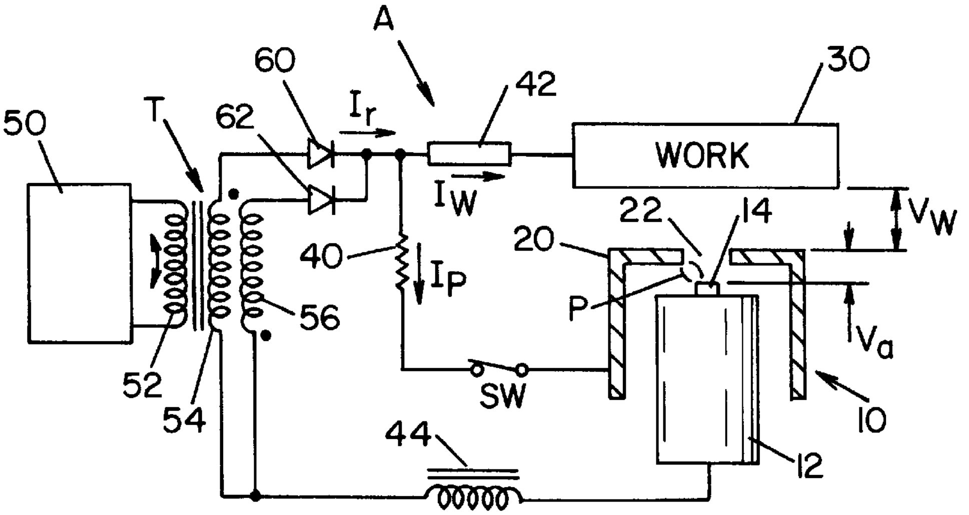
FIG. 1 (PRIOR ART)
FIG. 1 is a schematic wiring diagram of the prior art to which the present invention is directed.

Referring to the drawings, wherein the showing are for the purpose of illustrating the preferred embodiments only and not for the purpose of limiting same, FIG. 1 shows the prior art to which the present invention is directed wherein plasma system A includes a plasma torch 10 having a standard electrode 12 with a tip 14 mounted within nozzle 20 having an arc opening 22 which exposes workpiece 30 to electrode tip 14. Pilot arc P is created between the electrode and nozzle and has a voltage $V_a$ which in practice is about 150–160 volts. During operation of system A, workpiece 30 is spaced from nozzle 20. The voltage $V_W$ between the workpiece and the nozzle is created from pilot arc current $I_p$ flowing through resistor 40. Resistor 40 is connected in parallel between the workpiece 30 and nozzle 20 and is in a series circuit established by closing of switch SW. Current $I_W$ is the workpiece current, which flows as the workpiece is close to the nozzle, and is measured by shunt 42. The total current flow $I_r$ is the pilot arc current $I_p$ plus the workpiece current $I_W$. Inductor 44 maintains current flow between input pulses to the plasma system from power supply 50. In the illustrated prior art, D.C. power supply 50, which is a full bridge inverter, has a primary winding 52 for driving transformer T to create output pulses in oppositely poled secondary windings 54, 56. It is appreciated that full bridge rectifiers may include four secondary windings; however, for the purposes of describing the invention the number of secondary windings and the architecture for the primary windings is not important. Pulses are directed through a primary winding 52 to create pulses in secondary windings 54, 56. As a current pulse in one direction passes through primary 52 a current pulse of opposite polarities will be created in the separate secondary windings 54, 56. Diodes 60, 62 rectify the spaced output current pulses to pass only those current pulses which will give a D.C. operation to the power supply as it is connected to the workpiece 30 and torch 10. In operation, pilot arc P has a voltage of approximately 150 volts. Switch SW is opened to transfer the arc to workpiece 30. The voltage across resistor 40 is the voltage $V_W$, which is the same as the voltage between the nozzle and the workpiece. In practice, the voltage across resistor 40 is about 60 volts. Thus, in this example, the voltage between the workpiece 30 and electrode 12 is about 210 volts. In practice, an inductor is normally included between the electrode and transformer T. In that instance, a voltage will be generated across the inductor to maintain the pilot arc between separate, spaced output pulses in windings 54, 56. To initiate the cutting operation, switch SW is opened when at least 60 volts is available between the workpiece and the nozzle. With 60 volts available for arc transfer, the transfer of the arc can be accomplished only with the workpiece 30 relatively closely spaced from nozzle 20. This is the normal operation of the prior art to which the present invention is directed. The power supply in the prior art and in the preferred embodiments can take any of many normal constructions. It can be full forward or half forward with various output winding arrangements.

Figure 2:
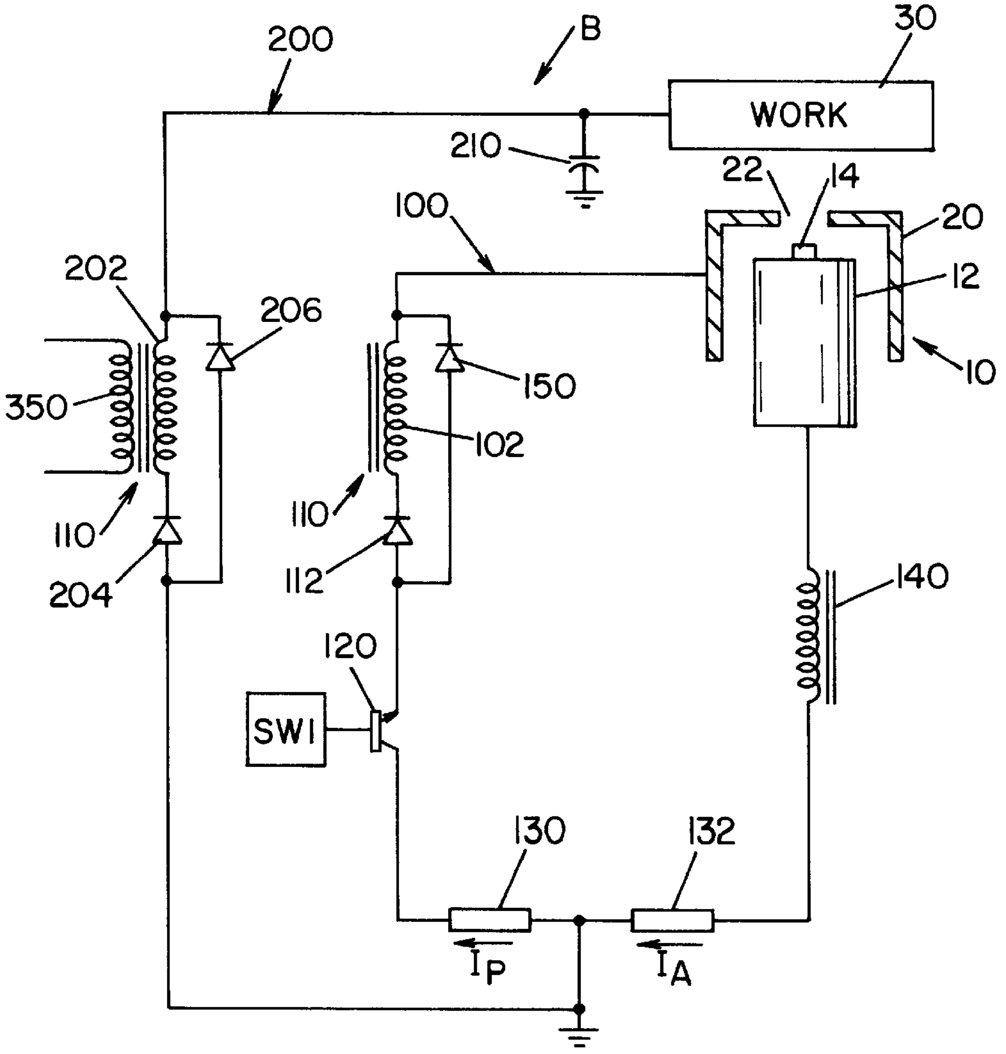
FIG. 2 is a schematic wiring diagram of the preferred embodiment of the present invention.

The drawings of the preferred embodiment of the invention are intended to illustrate the invention and not to limit the same. FIG. 2 shows plasma system B, constructed in accordance with the first embodiment of the present invention, wherein a first secondary circuit means 100 is used to create and maintain pilot arc between electrode 12 and nozzle 20. This circuit means includes its own separate secondary winding 102 on the core of output transformer 110 and including a rectifying diode 112 and freewheeling diode 150. In practice, more than one winding would be used in this circuit, with the windings being oppositely poled so that they would create discrete rectified pulses in a controlled polarity as the input of the transformer 110 is pulsed by current pulses in opposite directions by the inverter. Only a single winding is illustrated for simplicity. Appropriate winding arrangements are shown in Bilczo U.S. Pat. No. 4,897,522 and Bilczo U.S. Pat. No. 4,897,773. The windings have a number of turns to provide the necessary high voltage for creating and maintaining the pilot arc. Operation of system B in the particular areas of the voltage/current curves is shown in FIGS. 3C and 4B. Switch SW1 is shown as a transistor or IGBT 120. When switch SW1 is closed, circuit means 100 is in series with the electrode and nozzle of torch 10. In this manner, a pilot arc can be created by the voltage available from winding or windings 102. Shunt 132 measures the total current $I_A$ and is used for regulation. Shunt 130 is used to sense the pilot current. A choke or inductor 140 maintains current flow to sustain the pilot arc during periods between the spaced input pulses and, thus, spaced output pulses of transformer 110. In operation, switch SW1 is closed so transformer 110 can energize secondary winding 102, (two windings 102 are preferred). The current pulses in winding 102 creates a voltage across the gap between the electrode and the nozzle and across inductor or choke 140. In practice, the pilot arc voltage is approximately 150 volts and the choke 140 has a voltage of approximately 50 volts; therefore, the output of winding 102 is approximately 200 volts. If workpiece 30 is to be cut, it is moved close to torch 10. This proximity is sensed by the current in shunts 130 and 132 to open switch SW1 and energize second circuit means 200. This second circuit means includes secondary winding or windings 202, the rectifying diode 204 and a freewheeling diode 206. When switch SW1 is opened, the voltage across secondary winding, or windings 202 is available to immediately transfer the arc to the workpiece 30. Capacitor 210 maintains a peak voltage when no current is passing from the workpiece to the electrode, i.e. at times when workpiece 30 is out of position. In accordance with an aspect of the invention, current flow through workpiece 30 is the current flow at shunt 132, minus the current flow at the pilot arc shunt 130. In this embodiment of the invention, work current $I_W$ is indirectly measured without having an individual shunt for measuring this particular current. As will be explained later, the workpiece current is indicative of the proper conditions to allow transfer of the arc by opening switch SW1.

Figure 3A:
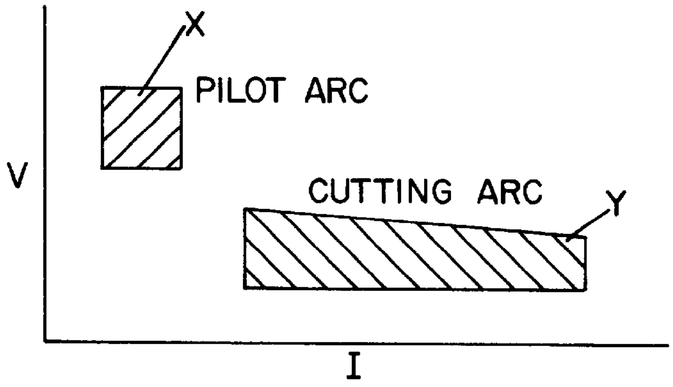
FIG. 3A is a voltage current graph showing the operating areas required for pilot arc and cutting arc modes of operation.
Figure 3B:
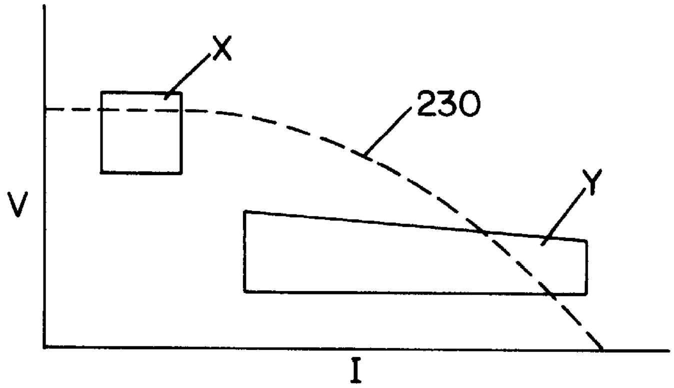
FIG. 3B (PRIOR ART)
FIG. 3B is a graph, such as shown in FIG. 3A, with a single voltage/current characteristic curve used in the prior art shown in FIG. 1.
Figure 3C:
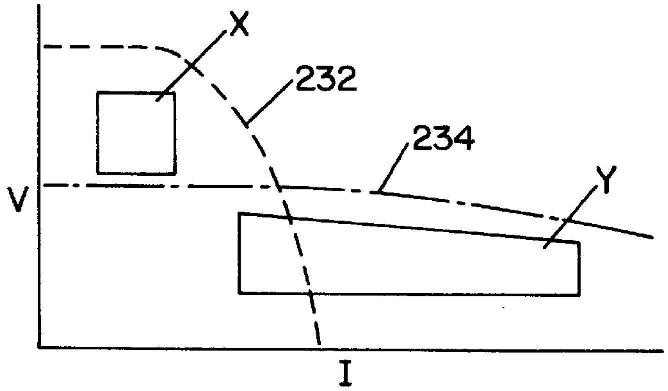
FIG. 3C is a graph like FIG. 3B showing two separate voltage/current characteristic curves as generated by the preferred embodiment of the invention shown in FIG. 2.
Figure 4A:
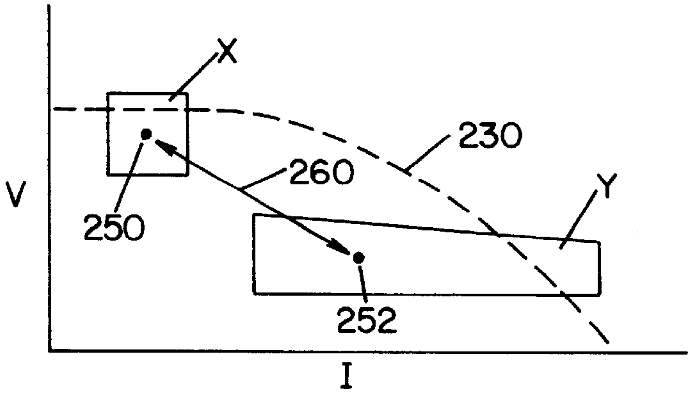
FIG. 4A (PRIOR ART)
FIG. 4A is a graph similar to FIG. 3B showing the transfer of control between two modes of operation in the prior art of the present invention with a single voltage/current operating curve.
Figure 4B:
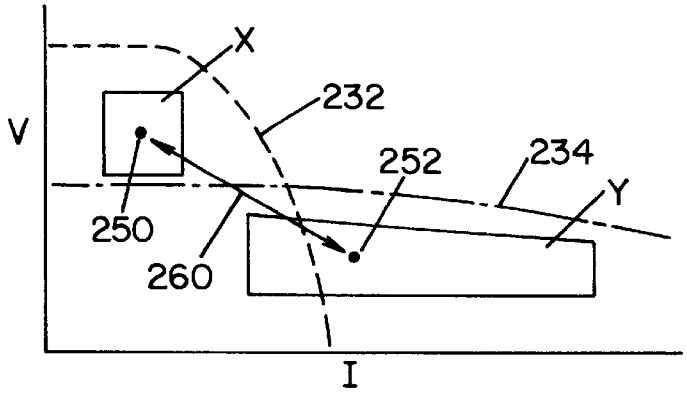
FIG. 4B is a graph similar to FIG. 4A showing the control shifting feature of the preferred embodiment of the present invention.
Figure 4C:
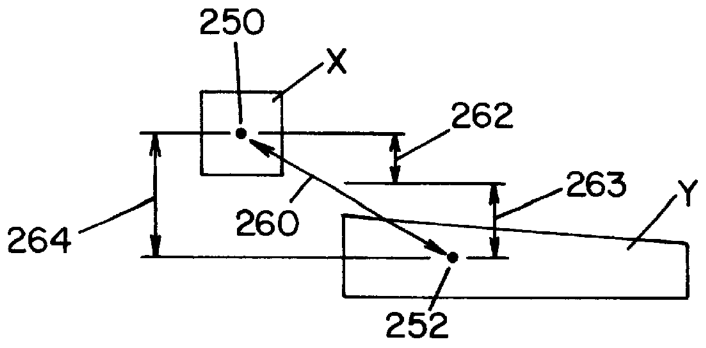
FIG. 4C is a schematic diagram illustrating the functional differences between the control transfer of the prior art shown in FIG. 4A and the control transfer of the preferred embodiment of the invention shown in FIG. 4B.

The voltage/current graphs shown in FIGS. 3A–3C and 4A–4C are used to illustrate the difference between the prior art shown in FIG. 1 and the preferred embodiment of the present invention as shown in FIG. 2. All of these graphs include an area X of operation for the pilot arc and an area Y of operation for the cutting arc. These are the areas of operation which are optimum and adjustable for use in the two modes of operation to which the present invention is directed. Referring now to FIG. 3A, area X is characterized as being high voltage and low current for the pilot arc. Area Y is characterized as being low voltage and higher currents. This area is the operating condition which defines the cutting operation. In FIG. 3B, single characteristic curve 230 of the prior art system is illustrated. Since a single winding 54, 56 is employed, a single characteristic curve 230 is created which is designed to intersect both areas X and Y. This single characteristic curve is not necessarily optimum for either area X or area Y. Referring now to FIG. 3C, the characteristic curve for winding 102 is curve 232 for circuit means 100. This curve is optimized for area X in the pilot mode of operation for system B. Characteristic curve 234 is developed by winding 202 for circuit means 200 and is optimum for area Y. In FIGS. 4A–4C, control points 250, 252 in areas X, Y, respectively, are the operating points selected for the control equipment when it is in the pilot mode of operation or the cutting mode of operation, respectively. As shown in FIG. 4A, the shift from point 250 to point 252 is along line 260. Thus, when switch SW of FIG. 1 is opened, the control equipment shifts the operation of system A along line 260 from point 250 to point 252. The same operation of the control equipment occurs when opening switch SW1 of system B, shown in FIG. 2. This is illustrated in FIG. 4B; however, the advantage between the invention and the prior art is schematically illustrated in FIG. 4C. When a shift is made from operating point 250 toward operating point 252, transformer output jumps a distance 262 and then is shifted gradually by the current control equipment to point 252. This is distinguished from the prior art which requires the current control equipment to immediately shift directly from point 250 to point 252, which distance is illustrated as dimension 264. It can be seen that the shift dimension 263 of the present invention is substantially less than the dimension 264 of the prior art. Consequently, by using the present invention, there is an immediate jump of the control point along line 260 and then a gradual shift to point 252. The prior art requires the control equipment to operate along the total distance line 260. Graphs illustrated in FIGS. 4A–4C are schematic in nature and are presented for purposes of understanding the advantage in controlling the operation of a plasma arc system when employing the present invention. The actual current control equipment is not part of the present invention. It is only necessary to realize that the use of separate windings for the pilot arc mode and the cutting mode has a distinct advantage in allowing operation of the system with different voltage/current curves.

Figure 5:
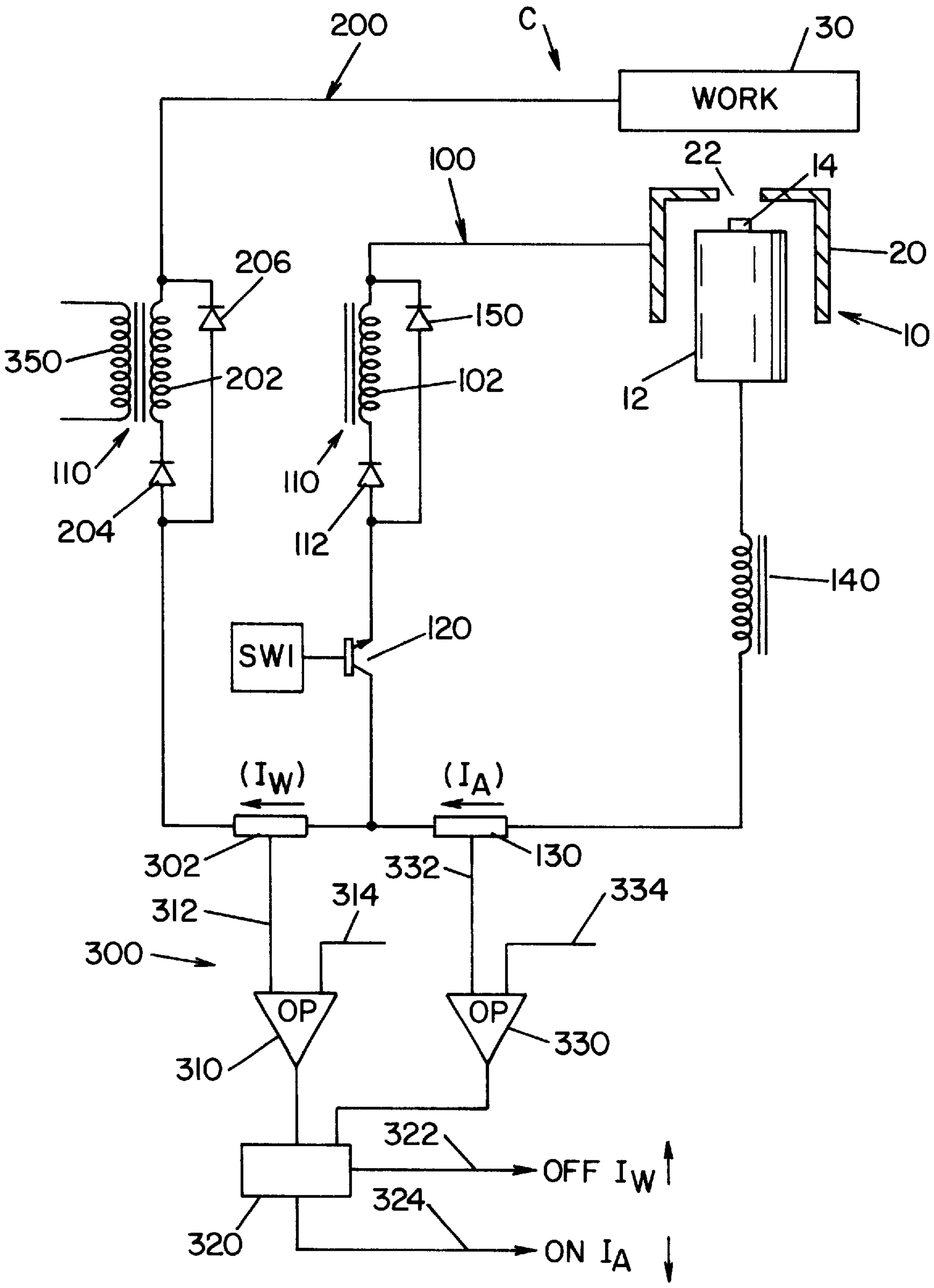
FIG. 5 is a schematic wiring diagram of the current sensing feature of the preferred embodiment of the present invention and illustrating a second configuration of the current shunts used to shift between pilot arc and cutting.
Figure 6:
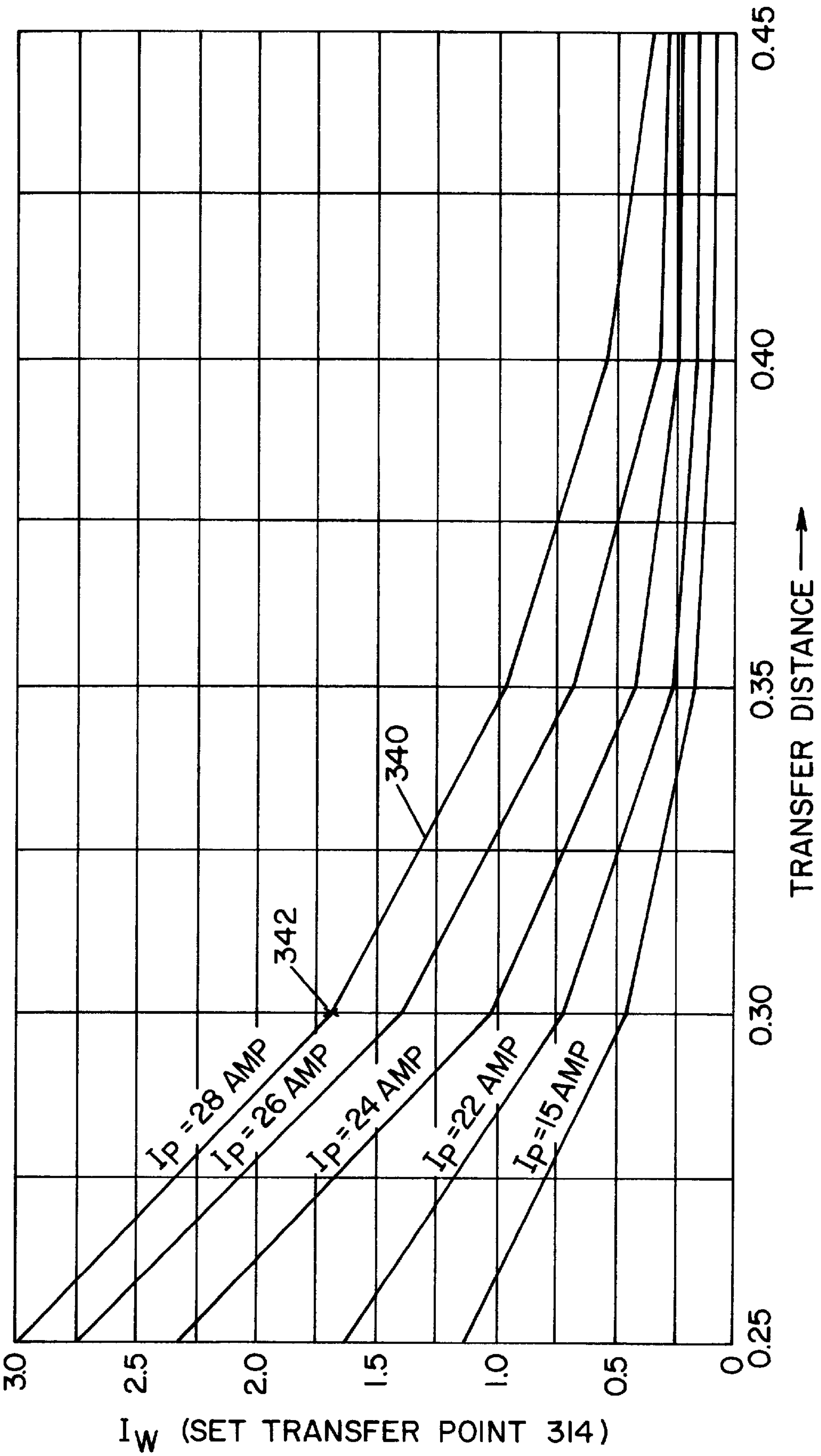
FIG. 6 is a graph illustrating standoff characteristics of the embodiment of the invention shown in FIG. 5.

To control the shift between the pilot arc mode of operation and the cutting mode of operation, an indirect measurement of the workpiece current is employed in system B, as shown in FIG. 2. A more direct use of the workpiece current $I_W$ is shown in FIG. 5 where system C includes a current responsive switching circuit 300 controlled by workpiece current sensor or shunt 302 and by the previously described arc shunt 130. Circuit 300 opens switch SW1 when the work current at shunt 302 is sensed to be above a given level. The switch is closed and, thus, reestablishes the pilot arc mode when the current in shunt 130 decreases to a given level. Circuit 300 accomplishes this objective by using a high gain operational amplifier 310 having a first input 312 representative of the work current $I_W$. A standoff reference signal in line 314 is compared to the voltage signal in line 312 to control the output of amplifier 310. When this amplifier produces a logic 1, switch station 320 is toggled to create a signal in output 322 which opens switch SW1. This turns off the pilot arc and immediately transfers the arc. By directly measuring the work current, system C detects when workpiece 30 is in the proper position and close enough to maintain a transfer arc. This is a direct measurement of actual workpiece current and can be accurately controlled by a reference voltage or threshold voltage in line 314 to give an accurate shift of the operation of torch 10 from circuit means 100 to circuit means 200. As the workpiece is removed, current $I_A$ decreases as a function of the transformer, the current is sensed or measured by shunt 130, which shunt controls high gain operational amplifier 330 with a voltage representative of the arc current. A reference voltage signal in line 334 creates a logic 1 in the output of operational amplifier 330 to toggle station 320 to produce a signal in line 324 which activates switch SW1 when current at shunt 130 is reduced below a threshold value. In this manner, the transfer of the arc is determined by the position of the workpiece. As the workpiece is moved toward the torch, the arc is transferred. As the workpiece is moved away from the torch, the arc is shifted back to the pilot arc mode. Referring now to FIG. 6, voltage levels for reference line 314 are illustrated in a general representative manner. To show the general scheme of implementing the shift to cutting as used in practice, reference is made to line 340 which is a line indicative of operation of a system operated at 28 amperes for the pilot arc. Assuming that the circuit 300 is to be adjusted for shifting to the cut mode at 0.30 spacing between the torch and the workpiece point 342 is selected. The reference in line 314 is adjusted to about 1.7 amperes for the work current $I_W$. When this workpiece current is detected by amplifier 310, switch SW1 is opened to shift from the first circuit means 100 to second circuit means 200 to start the cutting operation. In practice, the arc is transferred at 2 amperes or less. At 28 amperes of pilot arc current, maintained by $I_r$ as shown in FIG. 1, the transfer distance or standoff would be a little less than 0.30 inches. A lower transfer point in line 314 allows a greater standoff distance, but also requires a higher voltage $V_W$.

Figure 7:
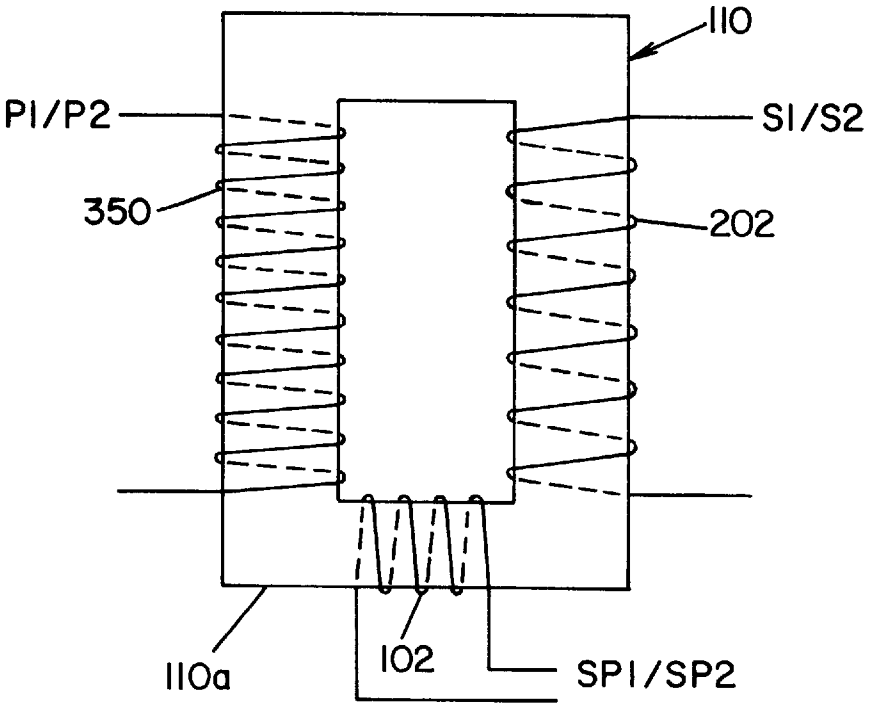
FIG. 7 is a schematic diagram of the inverter transformer used in the embodiment of the present invention with winding illustrated schematically.
Figure 9:
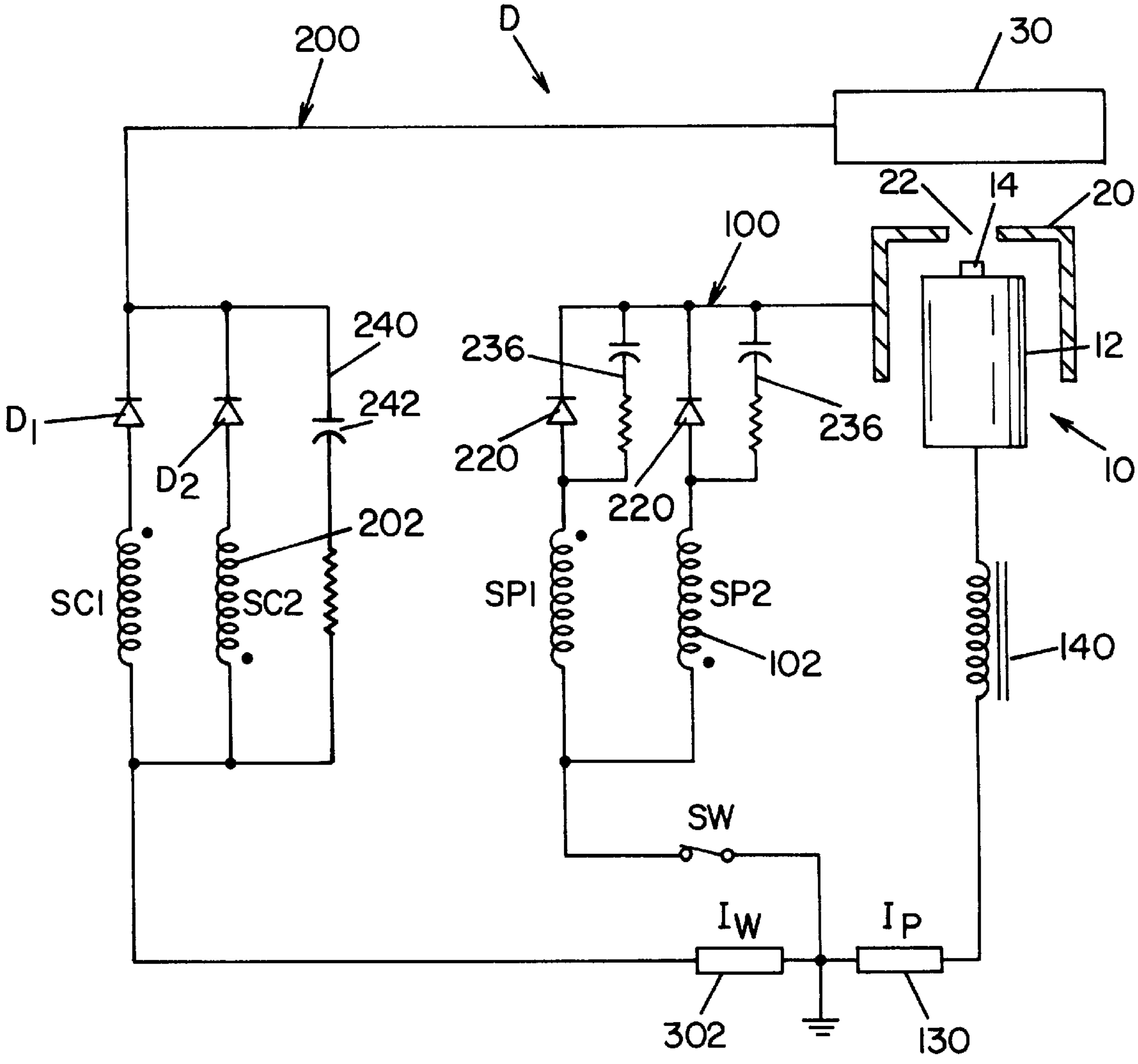
FIG. 9 is a schematic wiring diagram similar to FIG. 5 illustrating the preferred embodiment with the secondary winding network shown as including two oppositely poled windings as often used in practice.

Transformer 110 is schematically illustrated in FIG. 7 wherein the primary windings P1/P2 are illustrated as winding 350, which is also shown as the input windings in FIGS. 2 and 5. Secondary winding 102 for the pilot arc circuit means 100 is a relatively thin wire wrapped on the core 110*a* of the transformer 110 to produce high voltage and low current for the pilot mode of operation. Since a full bridge inverter is employed, two separate windings SP1, SP2 are used. These windings are oppositely poled, as shown in FIG. 9. In a like manner, the heavy secondary winding 202 includes oppositely poled windings S1/S2 as also shown in FIG. 9. It should be understood from FIG. 7 that the number of windings used in circuit means 100 and circuit means 200 is dictated by the power supply and the input network of the transformer. The invention involves use of two distinct winding networks for the separate operating modes; however, the number and arrangement of windings in the network may vary.

Figure 8:
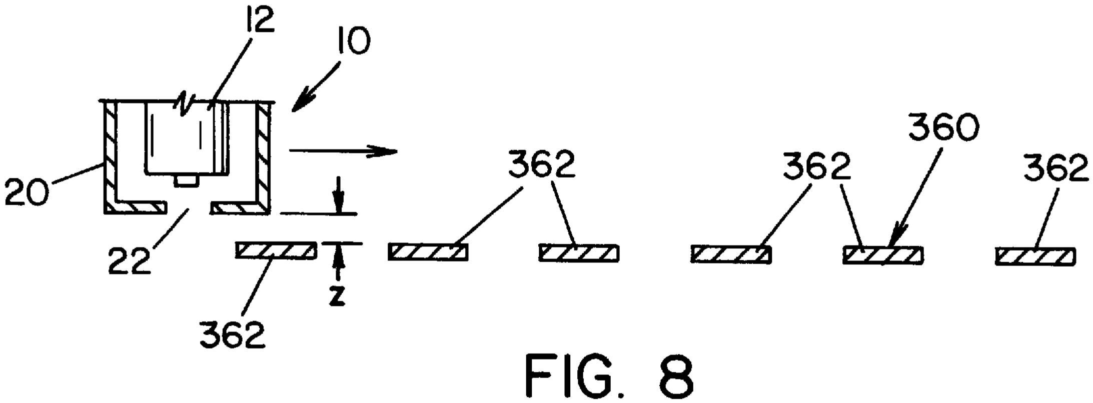
FIG. 8 is a side elevational view showing schematic use of the present invention for cutting a series of metal elements in the form of a sheet of expanded metal.

FIG. 8 illustrates a use of plasma torch 10 to cut an expanded metal sheet 360 having spaced elements 362. When the nozzle is over an element 362, the spacing z is relatively short; therefore, the current in shunt 302 increases beyond the threshold determined by the standoff voltage in line 314. If spacing $_z$ is less than the selected standoff distance explained in connection with FIGS. 5 and 6, the arc is transferred to cut the workpiece or element 362. After passing beyond element 362, there is an infinite spacing z; therefore, the current in shunt 130 is reduced and the pilot arc is maintained as explained by the operation of circuit 300 in FIG. 5. Rapid movement of the torch over the expanded metal sheet 360 is repeatedly and accurately controlled by transfer of the arc to the cutting mode and to the pilot mode dictated by the position of the workpiece with respect to torch 10 as sensed by shunts 130 and 302 of circuit 300. This is an advantage over the prior art and is permitted by the high accuracy arc transfer. This aspect of the invention could be implemented in the prior art shown in FIG. 1 where current sensing means would allow shifting between the pilot mode and the cutting mode.

Figure 10A:
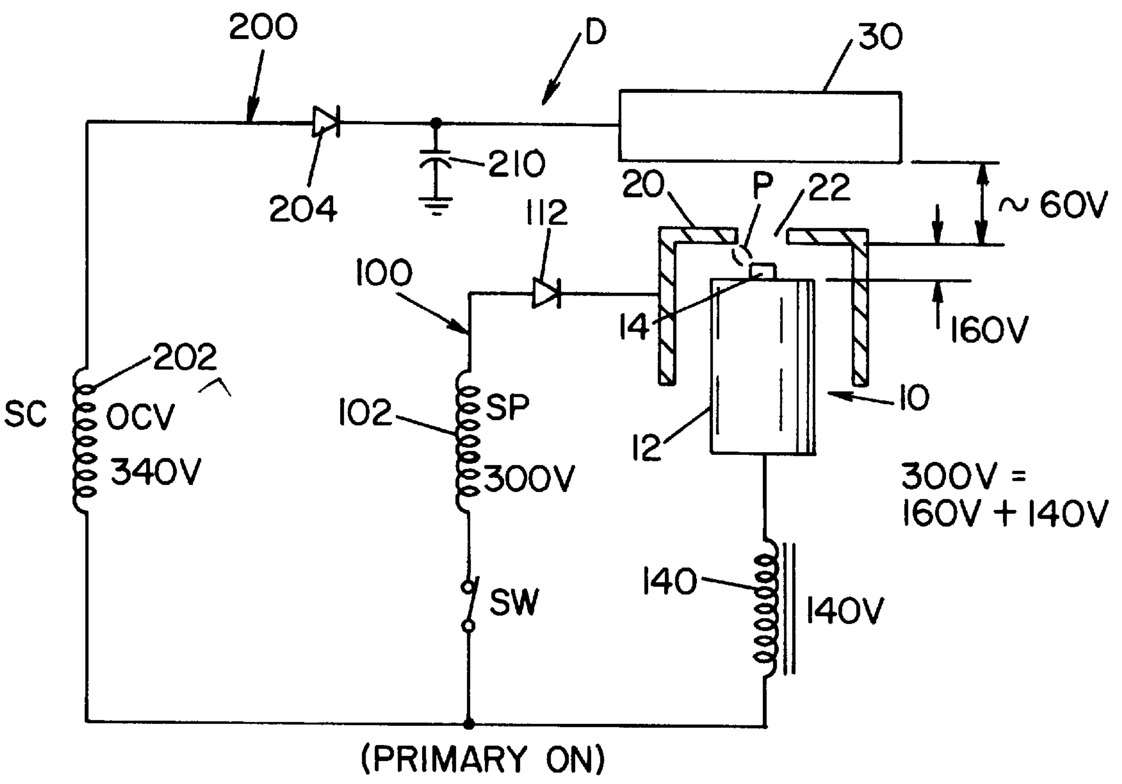
FIGS. 10A and 10B are simplified schematic wiring diagrams showing operating characteristics of the preferred embodiment of the invention illustrated in FIG. 9.
Figure 10B:
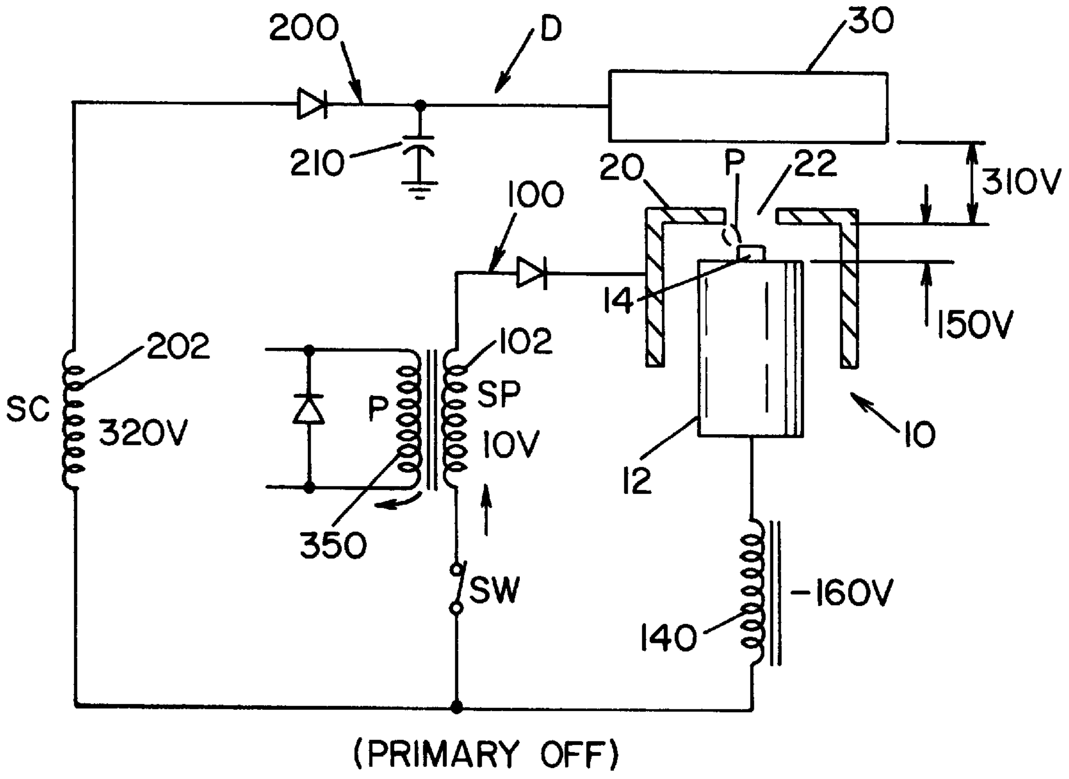
Figure 11:
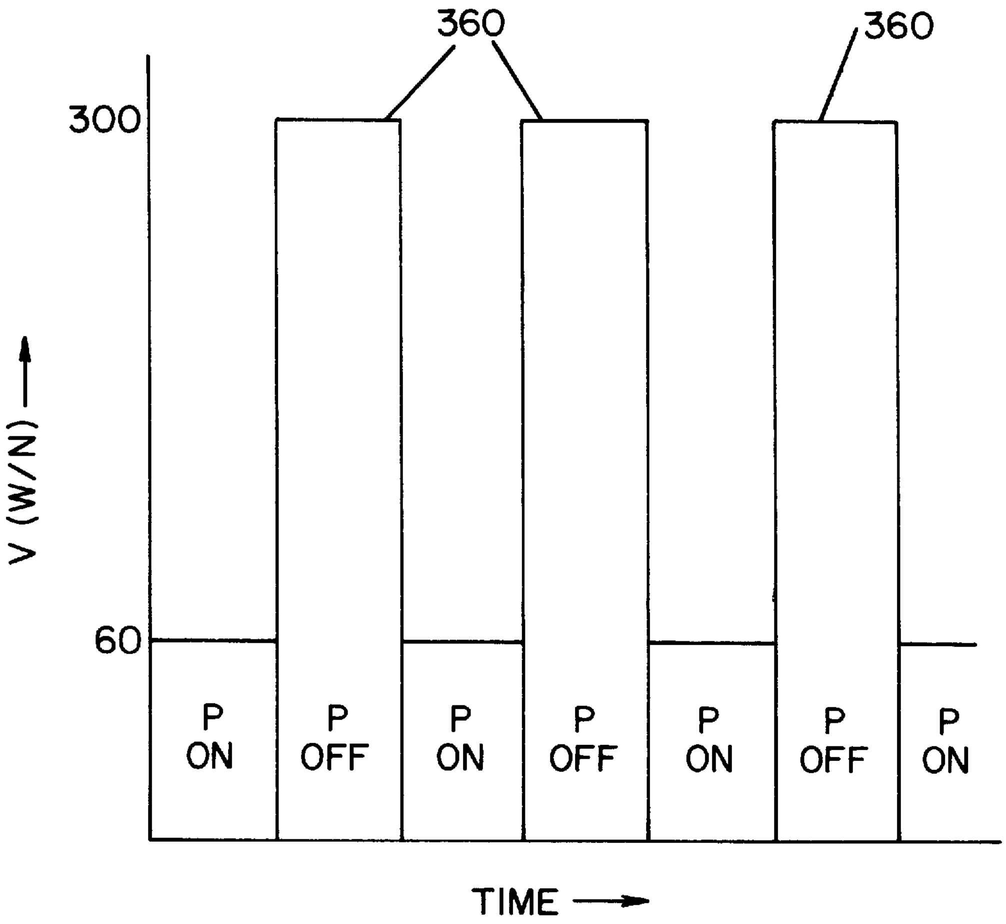
FIG. 11 is a pulse diagram showing the operation of the embodiment of the invention illustrated in FIGS. 10A and 10B; and, FIG. 12 is a further modification of the preferred embodiment of the present invention.

A further aspect of the present invention is illustrated in FIGS. 9–11 wherein the system C is modified to produce a system D. In this system, the two oppositely poled windings 102 and 202 are schematically illustrated as plasma secondary windings SP1, SP2 and SC1, SC2, respectively. The use of two oppositely poled secondary windings in parallel has been discussed previously as a normal inverter concept. The invention is not dependent on details of the transformer windings needed to produce the operating currents. The inverter power supply provides pulses in the secondary which have a length varied to control the regulated current $I_r$. In system D, the freewheeling diodes 150, 206 are removed, so that the freewheeling current flow occurs in primary winding 350 as shown in FIG. 2. Pilot arc windings SP1 and SP2 are oppositely poled and include rectifier diodes 220 and snubber circuits 230. Cut windings SC1 and SC2 are oppositely poled with a specific snubber circuit 240 with a storage capacitor 242 which is used to store high voltage between the workpiece and nozzle during the off cycles of the primary 350 for arc transfer when system D is operated in the pilot mode. By using the capacitor 242, circuit 200 produces a high workpiece to nozzle voltage which in practice is about 340 volts. This peak value is present when the primary voltage at winding 350 is off, i.e. between pulses of a push-pull transformer with primary freewheeling. The average workpiece to nozzle voltage is about 200 volts. Diode snubber circuit 240 stores energy during the primary off time and maximizes the workpiece to nozzle voltage. When the primary is on, the pilot arc is maintained by the pilot windings SP1, SP2. When this occurs, the pilot windings produce a voltage, in practice about 285 volts, which is divided between the pilot arc and the voltage across inductor 140. The pilot arc voltage is about 160 volts and the choke or inductor voltage is about 125 volts. The cut windings do not have a complete circuit so the open circuit voltage is created at windings SC1, SC2. These windings produce about 275 volts with an overshoot at turn on of about 25%. This voltage overshoot peak charges capacitor 242 to about 340 volts. This capacitor voltage is in series with the pilot arc voltage (160 volts) and the choke voltage (125 volts) to produce about 50–60 volts between the workpiece and the nozzle. When the primary voltage is turned off, the current flowing in the pilot circuit 100 will be maintained by the energy stored in the output choke 140. Current will continue to flow through the pilot windings SP1, SP2 with a very small voltage drop. Clamp diodes on the primary side of the transformer limit the primary voltage by freewheeling any current produced from the secondary circuits. The 160 volt pilot arc is maintained and −160 volts will appear across the output choke 140. The transformer windings SP1, SP2 are clamped to zero volts during this state but the cutting source still produces 340 volts. This voltage comes from the snubber capacitor 242 that was charged during the on state of the inverter. No current path exists in the cutting circuit 200 so capacitor 242 does not discharge. The cutting diodes $D_1$ and $D_2$ never conduct any freewheeling current. The pilot source voltage is very close to zero so the workpiece to nozzle voltage is equal to the voltage on capacitor 242, producing a workpiece to nozzle voltage of 340 volts.

Since the input pulses are at a rate which may be as high as several hundred pulses per second, there is a freewheeling period, or stage, between output pulses occurring in the pilot arc mode of operation. The advantage of the invention will be explained in connection with FIGS. 10A and 10B using representative voltages. With switch SW closed and pilot arc P established, as shown in FIG. 10A, pilot arc has a voltage, which in practice is about 160 volts. Inductor 140 has a representative voltage of 140 volts. Consequently, when a secondary pulse is created in winding 102, the voltage across winding 102 is approximately 300 volts. The open circuit voltage across winding 202 of circuit means 200 is approximately 275 volts with a 25% overshoot at turn on which peak charges capacitor 210, or the snubber capacitor 242 as shown in FIG. 9 to 340 volts. With these voltages, the workpiece to nozzle voltage is approximately 60 volts. When the output pulse is turned off by discontinuation of an input pulse, circuit means 100 attempts to freewheel. However, diode 150 shown in FIG. 5 has been removed from winding 102. Consequently, freewheeling of circuit means 100 occurs through winding 102, which is tightly coupled on transformer core 110*a* with primary winding 350 and produces a voltage drop of approximately 10 volts. During this freewheeling stage, the current is maintained by choke 140. This causes −160 volts to appear across the choke. The drop across winding 102 is 10 volts and the remaining 150 volts appear across the nozzle and electrode. Capacitor 210 remains charged from the on state and winding 102 has approximately 10 volts across it. This produces a workpiece to nozzle voltage of approximately 310 volts. Consequently, during the pilot arc mode of operation, extremely high voltage is applied between the workpiece and the nozzle. This process is illustrated in FIG. 11 where the high voltage pulses 360 are created between output pulses when the primary current pulses P are off. The rate of pulses 360 is at several $KH_Z$. The process is shown in FIG. 11 and is continuous as long as switch SW is closed. When the switch is opened for the purposes of transferring the arc to a cutting mode, a high voltage is available for the arc transfer process. This is a substantial advance in the art and drastically improves the transfer of the arc to the workpiece. The high workpiece to nozzle voltages enable the power supply to produce reliable arc transfers above 0.5 inches. In practice, this workpiece to nozzle voltage is limited to meet IEC974-1 specifications. This specification requires workpiece to nozzle voltage to be limited to 113 VDC peak. With a 113V peak limit, transfer distances will decrease but the power supply will meet this specification. Therefore, a standard voltage limiting circuit is added between the workpiece and the nozzle.

In practice the pilot arc windings have a higher turn ratio than the cutting windings. When the pilot arc switch is opened, the arc transfers to the workpiece and the load on the power supply changes from high voltage-low current to low voltage-high current. At this point, part of the transition occurs as a function of the different transformer windings. The remainder of the transition is handled by the control system. When the arc is retracted back to the nozzle (pilot arc) the same enhanced transition occurs. The load changes from low voltage-high current to high voltage-low current. Part of this transition instantaneously occurs when the pilot winding is switched back on. The response time of the control system can be reduced and the maximum number of transfers per second can increase.

When maximum primary current is a major design concern, the dual winding circuit, as shown in FIGS. 5 and 9, will be advantageous. For example, in a conventional single winding output circuit the ratio of the winding will be similar to the pilot ratio used above. However, this high turns ratio winding is also used for cutting and will require a large amount of primary current. When compared to the dual winding circuit, the conventional single winding circuit will require more primary current. The dual winding circuit reduces the maximum amount of primary current by having a cutting winding with a lower turns ratio.

Figure 12:
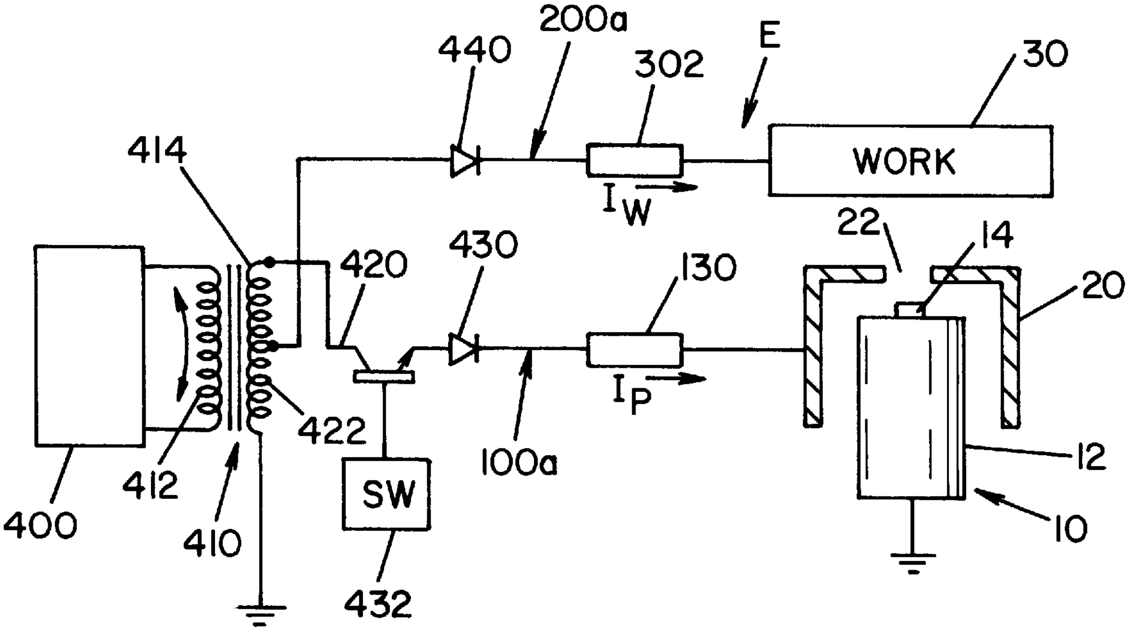

To illustrate the breadth of the present invention, a plasma system E is illustrated in FIG. 12 wherein power supply 400 creates alternating current pulses to drive output transformer 410 by passing the current pulses through primary winding 412. The secondary winding 414, which may include a set of oppositely poled windings as previously described, includes an intermediate tap 420 to define a lower secondary winding section 422. By using this output secondary network, a plasma arc circuit means 100*a* is created by using rectifying diode 430 and a switch 432. Current flow in circuit 100*a* is detected by shunt 130 to measure pilot arc current $I_p$. Circuit means 100*a* performs the function of circuit means 100 illustrated in the preferred embodiment of the invention. In a like manner, circuit means 200*a* has rectifying diode 440 and shunt 302 to operate during the cutting mode. Thus, a single secondary winding 414 can produce a concept similar to the two separate windings 102, 202 as used in the preferred embodiments of the present invention.

In practice of the invention the turn ratios for the pilot mode and the cutting mode are different, i.e. 26:26 for pilot arc and 26:24 for cutting. The invention can be used with the turn ratios the same; however, such an arrangement will lose some advantage of the invention because the two separate windings constituting the basic feature of the invention will operate on essentially the same output curve. However, the invention will still produce the high nozzle to workpiece voltage for arc transfer when the workpiece is moved close to the nozzle. An embodiment of the invention employs a cutting winding with a higher number of turns than the pilot winding to produce high voltage output for the cutting mode, such as when high voltage operation is beneficial, i.e., in gouging.

I claim:

1. In a plasma system including an electrode and nozzle with a plasma arc opening exposing said electrode to a workpiece and having an input transformer with a primary winding network and a secondary winding network driven by said primary winding network, a first circuit means driven by said secondary winding network for creating a pilot arc across said electrode and nozzle, a second circuit means driven by said secondary winding network for creating a plasma arc across said electrode and said workpiece and switching means for selectively shifting between said first circuit means and said second circuit means, the improvement comprising: said secondary winding network comprising a first winding means with a first effective number of turns for driving said first circuit means and a second winding means with a second effective number of turns for driving said second circuit means, said first and second effective number of turns being different.

2. The improvement as defined in claim 1 wherein said first winding means provide a first voltage range with a first general current range and said second winding means provide a second voltage range with a second general current range.

3. The improvement as defined in claim 2 wherein said first voltage range is substantially higher than said second voltage range.

4. The improvement as defined in claim 1 wherein said first winding means includes two separate secondary windings poled in the opposite directions and each having said first effective number of turns.

5. The improvement as defined in claim 4 wherein said second winding means includes two separate windings poled in the opposite directions and each having said second effective number of turns.

6. The improvement as defined in claim 1 including means for sensing a current level in one of said first and second circuit means and means for shifting said switching means to said second circuit means when said sensed current level exceeds a given current.

7. The improvement as defined in claim 6 wherein said sensed current level is the current between said workpiece and said electrode.

8. The improvement as defined in claim 1 including means for sensing a current value in one of said first and second circuit means and means for shifting said switching means to said first circuit means when said sensed current value is less than a given current.

9. The improvement as defined in claim 8 including means for sensing a current level in one of said first and second circuit means and means for shifting said switching means to said second circuit means when said sensed current level exceeds a given current.

10. The improvement as defined in claim 8 wherein said sensed current value is the current from said workpiece to said electrode.

11. The improvement as defined in claim 1 wherein said second winding means is a portion of said first winding means.

12. The improvement as defined in claim 2 wherein said second winding means is a portion of said first winding means.

13. The improvement as defined in claim 4 wherein said second winding means is a portion of said first winding means.

14. The plasma system as defined in claim 1 including first sensing means for sensing a current level in one of said first and second circuit means and means for shifting said switching means to said second circuit means when said sensed current level exceeds a given current.

15. The plasma system as defined in claim 14 including second sensing means for sensing a current value in one of said first and second circuit means and means for shifting said switch means to said first circuit means when said sensed current value is less than given current.

16. The plasma system as defined in claim 7 including second sensing means for sensing a current value in one of said first and second circuit means and means for shifting said switch means to said first circuit means when said sensed current value is less than given current.

17. The method of operating a plasma system of the type including an electrode and nozzle with a plasma arc opening exposing said electrode to a workpiece and having an input transformer with a primary winding network and a secondary winding network driven by said primary winding network, a first circuit means driven by said secondary winding network for creating a pilot arc across said electrode and nozzle, a second circuit means driven by said secondary winding network for creating a plasma arc across said electrode and said workpiece and switching means for selectively shifting between said first circuit means and said second circuit means, said method comprising the steps of:

(a) providing said secondary winding network as a first winding means with a first effective number of turns for driving said first circuit means and a second winding means with a second effective number of turns for driving said second circuit means, said first and second effective number of turns being different;

(b) sensing a current level in one of said first and second circuit means; and, (c) means for shifting said switching means to said second circuit means when said sensed current level exceeds a given value.

18. The method as defined in claim 17 including the additional steps of:

(d) sensing a current value in one of said first and second circuit means; and, (e) shifting said switch means to said first circuit means when said sensed current value is less than given level.

19. In a plasma system including an electrode and nozzle with a plasma arc opening exposing said electrode to a workpiece and having an input transformer with a primary winding network and a secondary winding network driven by said primary winding network, a first circuit means driven by said secondary winding network for creating a pilot arc across said electrode and nozzle, a second circuit means driven by said secondary winding network for creating a plasma arc across said electrode and said workpiece and switching means for selectively shifting between said first circuit means and said second circuit means, the improvement comprising: first sensing means for sensing a current level in one of said first and second circuit means and means for shifting said switching means to said second circuit means when said sensed current level exceeds a given value.

20. The improvement as defined in claim 19 including second sensing means for sensing a current value in one of said first and second circuit means and means for shifting said switch means to said first circuit when said sensed current value is less than given level.

21. In a plasma system including an electrode and nozzle with a plasma arc opening exposing said electrode to a workpiece and having an input transformer with a primary winding network and a secondary winding network driven by said primary winding network, a first circuit means driven by said secondary winding network for creating a pilot arc across said electrode and nozzle, a second circuit means driven by said secondary winding network for creating a plasma arc across said electrode and said workpiece and means for shifting between said first circuit means and said second circuit means, the improvement comprising: said secondary winding network comprising a first winding means with an effective number of turns for driving said first circuit means and a second winding means with an effective number of turns for driving said second circuit means.

22. The method of operating a plasma system of the type including an electrode and nozzle with a plasma arc opening exposing said electrode to a workpiece and having an input transformer with a primary winding network and a secondary winding network driven by said primary winding network, a first circuit means driven by said secondary winding network for creating a pilot arc across said electrode and nozzle, a second circuit means driven by said secondary winding network for creating a plasma arc across said electrode and said workpiece and means for shifting between said first circuit means and said second circuit means, said method comprising the steps of:

(a) providing said secondary winding network as a first winding means with an effective number of turns for driving said first circuit means and a second winding means with an effective number of turns for driving said second circuit means;

(b) sensing a current level in one of said first and second circuit means; and, (c) means for shifting to said second circuit means when said sensed current level exceeds a given value.

23. The method as defined in claim 22 including the additional steps of:

(d) sensing a current value in one of said first and second circuit means; and, (e) shifting to said first circuit means when said sensed current value is less than given level.

24. In a plasma system including an electrode and nozzle with a plasma arc opening exposing said electrode to a workpiece and having an input transformer with a primary winding network and a secondary winding network driven by said primary winding network, a first circuit means driven by said secondary winding network for creating a pilot arc across said electrode and nozzle, a second circuit means driven by said secondary winding network for creating a plasma arc across said electrode and said workpiece and means for shifting between said first circuit means and said second circuit means, the improvement comprising: first sensing means for sensing a current level in one of said first and second circuit means and means for shifting to said second circuit means when said sensed current level exceeds a given value.

25. The improvement as defined in claim 24 including second sensing means for sensing a current value in one of said first and second circuit means and means for shifting to said first circuit when said sensed current value is less than given level.

* * * * *